(12) United States Patent
Shimada et al.

(10) Patent No.: US 7,700,509 B2
(45) Date of Patent: *Apr. 20, 2010

(54) METHOD OF PRODUCING SEMICONDUCTOR PORCELAIN COMPOSITION

(75) Inventors: Takeshi Shimada, Osaka (JP); Koichi Terao, Osaka (JP); Kazuya Toji, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/910,222

(22) PCT Filed: Mar. 31, 2006

(86) PCT No.: PCT/JP2006/306816

§ 371 (c)(1),
(2), (4) Date: Dec. 12, 2007

(87) PCT Pub. No.: WO2006/106910

PCT Pub. Date: Oct. 12, 2006

(65) Prior Publication Data

US 2008/0286185 A1    Nov. 20, 2008

(30) Foreign Application Priority Data

Mar. 31, 2005    (JP) .................. P 2005-103721

(51) Int. Cl.
- C04B 35/00 (2006.01)
- C01F 17/00 (2006.01)
- C01D 15/02 (2006.01)
- C01B 13/14 (2006.01)
- C04B 35/46 (2006.01)
- H01B 1/08 (2006.01)

(52) U.S. Cl. ............. 501/137; 501/134; 501/136; 501/152; 423/263; 423/592.1; 423/617; 423/635; 423/641; 252/518.1

(58) Field of Classification Search .......... 423/263, 423/592.1, 617, 641, 635; 501/134, 136, 501/137, 152; H01B 1/08; H01C 7/02; C04B 35/46
See application file for complete search history.

(56) References Cited

U.S. PATENT DOCUMENTS

| 4,191,665 A | * | 3/1980 | Mandai ............... 252/519.12 |
| 4,384,989 A | * | 5/1983 | Kamigaito et al. ......... 252/516 |
| 2002/0098968 A1 | | 7/2002 | Takahashi et al. |

FOREIGN PATENT DOCUMENTS

| JP | 56-169301 | 12/1981 |
| JP | 59-16303 | 1/1984 |
| JP | 2002-160967 | 6/2002 |
| JP | 2005-255493 | 9/2005 |

OTHER PUBLICATIONS

Akashi et al, English translation of JP56-169301,manufacturing method of barium titanate semiconductor porcelain.*
Abicht et al, the influence of silicon on microsctructure and electrical properties of La-doped BaTiO3 ceramics, (Journal of Materials Science 1991, 26:2337-2342).*
Search Report issued in International Patent Application No. PCT/JP2006/306816.
*Titabari Kenkyukai Shiryo* XVII-95-659 (1968).
MacChesney et al., "Factors and Mechanisms Affecting the Positive Temperature Coefficient of Resistivity of Barium Titanate," J. Am.Ceram. Soc. 48, 81 (1965).

* cited by examiner

*Primary Examiner*—Melvin C Mayes
*Assistant Examiner*—Jun Li
(74) *Attorney, Agent, or Firm*—Stein McEwen, LLP

(57) ABSTRACT

A method of producing a semiconductor disk represented by a composition formula $[(Bi_{0.5}Na_{0.5})_x(Ba_{1-y}R_y)_{1-x}]TiO_3$, in which R is at least one element of La, Dy, Eu, Gd and Y and x and y each satisfy $0 \leq x \leq 0.14$, and $0.002 \leq y \leq 0.02$ includes carrying out a sintering in an inert gas atmosphere with an oxygen concentration of 9 ppm to 1% and wherein a treatment at an elevated temperature in an oxidizing atmosphere after the sintering is not carried out.

5 Claims, 1 Drawing Sheet

METHOD OF PRODUCING SEMICONDUCTOR PORCELAIN COMPOSITION

CROSS-REFERENCE TO RELATED APPLICATIONS

This application claims the benefit of PCT International Patent Application No. PCT/JP2006/306816, filed Mar. 31, 2006, and Japanese Patent Application No. 2005-103721, filed Mar. 31, 2005, in the Japanese Intellectual Property Office, the disclosures of which are incorporated herein by reference.

TECHNICAL FIELD

The present invention relates to a method of producing a semiconductor porcelain composition for use in a PTC thermistor, a PTC heater, a PTC switch, a temperature detector or the like, which has a positive resistance temperature, has a considerably reduced resistivity at room temperature, and is capable of providing a property uniform to an inner portion of a material.

BACKGROUND ART

Conventionally, as a material showing a positive PCTR, there has been proposed a composition constituted by adding various semiconductor forming elements to $BaTiO_3$. These compositions are provided with Curie temperature of around 120° C., and therefore, it is necessary to shift the Curie temperature in accordance with the application.

For example, although it has been proposed to shift Curie temperature by adding $SrTiO_3$ to $BaTiO_3$, in this case, the Curie temperature is shifted only in a negative direction and is not shifted in a positive direction. Currently, only $PbTiO_3$ is known as an additive element for shifting Curie temperature in a positive direction. However, $PbTiO_3$ includes an element for bringing about environmental contamination, and therefore, in recent years, a material in which $PbTiO_3$ is not employed has been desired.

In $BaTiO_3$ semiconductor porcelain, with an object of preventing a reduction in a resistance temperature coefficient by Pb substitution, as well as reducing a voltage dependency and promoting a productivity and a reliability, there has been proposed a method of producing a $BaTiO_3$ semiconductor porcelain in which a composition, obtained by adding one or more kinds of any of Nb, Ta and a rare earth element to a composition in which x in $Ba_{1-2x}(BiNa)_xTiO_3$ where a portion of Ba of $BaTiO_3$ is substituted by Ba—Na is controlled to a range of $0<x<0.15$, is sintered in nitrogen, and thereafter subjected to a heat treatment in an oxidizing atmosphere (see Patent Reference 1).

Patent Reference 1: JP-A-56-169301

In the case in which a valence control of the composition is carried out in a system in which a portion of Ba is substituted by Bi—Na, when a trivalent positive ion is added as a semiconductor forming element, the effect of semiconductor formation is reduced by the presence of monovalent Na ion, and the resistivity at room temperature is increased. Although, in Patent Reference 1, as an embodiment, there has been disclosed a composition constituted by adding 0.1 mol % of $Nd_2O_3$ to $Ba_{1-2x}(BiNa)TiO_3$ ($0<x\leq0.15$) as a semiconductor element, the additive amount of $Nd_2O_3$ cannot realize semiconductor formation sufficient for PTC application.

In the above-described material, the resistance value thereof is conceived to be caused by Schottky barrier of a grain boundary. As means of controlling the Schottky barrier, oxidation/deoxidation treatment of a grain boundary has been proposed, and it is reported that a high PTC property can be achieved by a material generally subjected to oxidizing treatment in oxygen (see Nonpatent Reference 1). Further, it has been also reported that a treatment rate in the heat treatment also influences on a property (see Nonpatent Reference 2) to pose a problem that the heat treatment of the material becomes very complicated.

Nonpatent Reference 1: *Titabari Kenkyukai Shiryo* XVII-95-659 (1968)

Nonpatent Reference 2: J. Am. Ceram. Soc. 48, 81 (1965)

Further, according to the heat treatment, there poses a problem that, although the effect by the heat treatment can act uniformly to an inner portion of the material when the shape of the material is a comparatively small, in the case of a comparatively large shape (thick shape) applied in the application such as a PTC heater, it is difficult to provide a PTC property uniform to the inner portion of the material.

DISCLOSURE OF THE INVENTION

It is an object of the present invention to solve the above-described conventional problem and to provide a production method of providing a semiconductor porcelain composition which is capable of shifting a Curie temperature in a positive direction without using Pb and has a considerably reduced resistivity at room temperature.

Further, it is another object of the present invention to provide a method of producing a semiconductor porcelain composition which is capable of providing a property uniform to an inner portion of a material even in a material having a comparatively large and thick shape without carrying out a complicated heat treatment.

The inventors paid attention to a valence control when Ba is substituted with Bi—Na in a $BaTiO_3$ semiconductor porcelain composition, and as a result of an intensive research of a content of an additive element for carrying out an optimum valence control, the inventors found that by substituting Ba with an R element in a specific amount, the optimum valence control can be achieved and a resistivity at room temperature can considerably be reduced.

Further, as a result of a research of a method of producing the semiconductor porcelain composition, the inventors found that, by carrying out sintering of the composition in an inert gas atmosphere with an oxygen concentration equal to or smaller than 1%, a PTC property uniform to the inner portion of the composition can be provided, and a semiconductor porcelain composition having an excellent property can be provided without carrying out a complicated control of an atmosphere, a treatment rate or the like. Thus the invention has been completed.

A method of producing a semiconductor porcelain composition according to the invention is a method of producing a semiconductor porcelain composition represented by a composition formula $[(Bi_{0.5}Na_{0.5})_x(Ba_{1-y}R_y)_{1-x}]TiO_3$ in which R is at least one element of La, Dy, Eu, Gd and Y, and x and y each satisfy $0<x\leq0.14$ and $0.002\leq y\leq0.02$, the method comprising carrying out a sintering in an inert gas atmosphere with an oxygen concentration equal to or smaller than 1%.

The invention also proposes a constitution according to the above-described method of producing a semiconductor porcelain composition, in which an oxygen concentration is equal to or smaller than 10 ppm, and a constitution in which an oxide of Si is contained in an amount of 3.0 mol % or smaller, and an oxide of Ca is contained in amount of 3.0 mol % or smaller.

According to the invention, there can be provided a semiconductor porcelain composition which is capable of elevating a Curie temperature thereof without using Pb which brings about an environmental contamination, and has a considerably reduced resistivity at room temperature.

According to the invention, a property uniform to the inner portion of the material can also be provided to the semiconductor porcelain composition having a comparatively large and thick shape.

According to the invention, since it is not necessary to carry out a complicated heat treatment, a semiconductor porcelain composition having an excellent property can be provided at low cost.

BEST MODE FOR CARRYING OUT THE INVENTION

One of characteristics of the invention resides in that a Curie temperature is shifted in a positive direction by substituting a portion of Ba with Bi—Na, and in that, for optimally controlling a valence disturbed by the Bi—Na substitution, a portion of Ba is substituted with a specific amount of R element (at least one element of La, Dy, Eu, Gd and Y) to give a $[(Bi_{0.5}Na_{0.5})_x(Ba_{1-y}R_y)_{1-x}]TiO_3$ composition. The reason of limiting the respective compositions is described as follows.

In the $[(Bi_{0.5}Na_{0.5})_x(Ba_{1-y}R_y)_{1-x}]TiO_3$ composition, R is at least one element of La, Dy, Eu, Gd and Y. In a preferable embodiment, R is La. In the composition formula, x indicates a content range of Bi+Na and a preferable range thereof is $0<x<0.14$. When x is 0, the Curie temperature cannot be shifted to high temperature side, while when it exceeds 0.14, the resistivity at room temperature becomes near to $10^4$ Ωcm and it becomes difficult to apply to a PTC heater or the like, which are not preferable.

In addition, y shows a content range of R and $0.002 \leq y \leq 0.02$ is a preferable range. When y is less than 0.02, the valence control of the composition becomes insufficient and the resistivity at room temperature becomes increased. Further, when y exceeds 0.02, the resistivity at room temperature becomes increased, and therefore, it is not preferable. A preferable range of y is $0.005 \leq y \leq 0.02$, and the resistivity at room temperature can further be reduced. The range $0.002 \leq y \leq 0.02$ mentioned above becomes 0.2 mol % through 2.0 mol % in mol % expression.

In the $[(Bi_{0.5}Na_{0.5})_x(Ba_{1-y}R_y)_{1-x}]TiO_3$ composition, it is preferable to add an oxide of Si in an amount of 3.0 mol % or smaller, and add an oxide of Ca in an amount of 4.0 mol % or smaller. Addition of the Si oxide restrains abnormal growth of crystal grain and can easily control the resistivity, and addition of the oxide of Ca can promote a sintering performance at a low temperature. In any of the oxides, when added in an amount exceeding the limit amounts, the composition does not show semiconductor formation, and therefore, it is not preferable.

Another characteristic of the invention resides in that, in the method of producing the $[(Bi_{0.5}Na_{0.5})_x(Ba_{1-y}R_y)_{1-x}]TiO_3$ composition, sintering is carried out in an inert gas atmosphere with an oxygen concentration equal to or smaller than 1%. A further preferable oxygen concentration is equal to or smaller than 10 ppm. Thereby, a complicated heat treatment in an oxygen atmosphere which has been carried out conventionally becomes unnecessary and a property uniform to the inner portion of the material can be provided in the material having a comparatively large and thick shape.

When the oxygen concentration exceeds 1%, the property uniform to the inner portion of the material cannot be provided, and therefore, it is not preferable. As the inert gas, nitrogen, argon, helium, carbon dioxide gas or the like can be used. In sintering, it is preferable to use a sintering furnace having an airtight structure.

An example of the method of producing a semiconductor porcelain composition according to the invention will be explained below. With regard to a step other than a sintering step, it is not limited in the following but a publicly-known method can be adopted therefor.

(1) Powders of $BaCO_3$ and $TiO_2$ as main raw materials; at least one of $La_2O_3$, $Dy_2O_3$, $Eu_2O_3$, $Gd_2O_3$ and $Y_2O_3$ as semiconductor forming elements and valence control elements; $SiO_2$ and CaO as sinter assisting agents; and $(Na_2CO_3.Bi_2O_3.TiO_2)$ as shifters of Curie temperature are respectively prepared.

(2) The respective powders are mixed in a wet process and then dried. At this occasion, depending on a particle size of the raw material powder, pulverization may be carried out simultaneously with mixing. As a medium in the mixing, pure water or ethanol is preferable. It is preferable that a mean particle size of a mixed powder after mixed or pulverized is 0.6 μm through 1.5 μm.

(3) A mixed powder is calcined. It is preferable that a calcinating temperature is 900° C. through 1100° C. It is preferable that calcinating time is 2 hours through 6 hours. It is preferable that a calcinating atmosphere is in the atmosphere or in oxygen.

(4) A calcined product after calcination is finely pulverized and then dried. It is preferable that fine pulverization is carried out in a wet process. It is preferable that a medium in the pulverization is pure water or ethanol. It is preferable that a mean particle size of a pulverized powder after fine pulverization is 0.6 μm through 1.5 μm.

(5) The pulverized powder after fine pulverization is formed by a desired forming means. Before forming, the pulverized powder may be optionally granulated by a granulating apparatus. It is preferable that a formed product density after forming is 2 through 3 g/cm$^3$.

(6) The formed product is sintered. With regard to a sintering atmosphere, as descried above, when the inert gas is, for example, nitrogen, sintering is carried out in an atmosphere containing 99% or more of nitrogen, with an oxygen concentration of 1% or less, preferably 10 ppm or less. It is preferable that a sintering temperature is 1200° C. through 1400° C. , and it is preferable that a sintering period is 2 hours through 4 hours. When the powder is granulated, it is preferable to carry out a treatment of removing a binder at 300° C. through 700° C.

By including the above-described sintering step as an indispensable step, there can be provided the semiconductor porcelain composition having $[(Bi_{0.5}Na_{0.5})_x(Ba_{1-y}R_y)_{1-x}]TiO_3$ composition and being considerably reduced in the resisitvity at room temperature.

EXAMPLES

Powders of $BaCO_3$ and $TiO_2$ as main raw materials; $La_2O_3$, $Dy_2O_3$, $Eu_2O_3$, $Gd_2O_3$ and $Y_2O_3$ as semiconductor forming elements and valence control elements; $SiO_2$ and CaO as sinter assisting agents; and $(Na_2CO_3.Bi_2O_3.TiO_2)$ as shifters of Curie temperature were respectively prepared. The respective powders were blended as shown in Table 1 to give a composition of $[(Bi_{0.5}Na_{0.5})_x(Ba_{1-y}R_y)_{1-x}]TiO_3$, mixed in ethanol, and then dried to provide a mixed powder having a mean particle size of about 9.0 μm.

The mixed powder was calcined at 1000° C. for 4 hours in the atmosphere, the resulting calcined powder was pulverized by wet pulverization to a mean particle size of 0.9 μm, and then the resulting pulverized powder was dried. Successively, PVA was added to the dried powder, and the resulting mixture was mixed and then granulated by a granulating apparatus. The resulting granulated powder was formed by a monoaxis press apparatus to provide a formed product having a dimension of 28.5 mm×28.5 mm with a thickness of 0.7 mm through 18 mm, and a forming density of 2.5 through 3.5 g/cm$^3$.

The formed product was subjected to binder removement at 300° C. through 700° C., thereafter, in a nitrogen atmosphere having an oxygen concentration shown in Table 1, the formed product was sintered at 1280 through 1380° C. for 4 hours in accordance with respective compositions to provide a sintered product having a dimension of 23.0 mm×23.0 mm with a thickness of 0.5 mm through 15 mm and a sintering density of 5.5 g/cm$^3$. The resulting sintered product was processed into a plate-like shape of 10 mm×10 mm×1 mm (provided that a case of a thickness of the sintered product equal to or smaller than 1 mm was excepted) to provide a test piece.

Thermal changes of resistance values of the respective test pieces were measured by a resistance measuring instrument in a range of room temperature through 270° C. Results of the measurement are shown in Table 1. In Table 1, sample number 52 is an example using Dy as R, sample number 53 is an example using Eu as R, sample number 54 is an example using Gd as R, sample number 55 is an example using Y as R.

Further, in Table 1, comparative examples are attached with * marks at sides of sample numbers. FIG. 1 is a graph showing a thermal change of a resistivity in each case that, in $[(Bi_{0.5}Na_{0.5})_x(Ba_{1-y}La_y)_{1-x}]TiO_3$ composition, the value of y is set at 0.006, and the value of x is set at 0.02 (black circle a), 0.075 (black circle b), 0.875 (black rhombic c), 0.1 (black square d), 0.1375 (black triangle e), or 0.2 (white circle t.

As is apparent from Table 1 and FIG. 1, according to a semiconductor porcelain composition provided by the example of the invention, Curie temperature can be elevated without using Pb and a resistivity at room temperature can be considerably reduced.

Further, as is apparent from Table 1 and FIG. 1, an excellent property is provided in the range that x satisfies $0<x\leq0.14$, and y satisfies of $0.002\leq y\leq0.02$.

Further, as is apparent from Table 1, it is understood that when sintered in an atmosphere with an oxygen concentration equal to or smaller than 1%, an excellent property is achieved, and further, the excellent property is achieved even in a comparatively large material having a thickness of 15 mm. This is because the property uniform to an inner portion of the material can be provided by carrying out sintering in an inert gas atmosphere with an oxygen concentration equal to or smaller than 1%.

TABLE 1

| No. | x | y | SiO$_2$ (mol %) | CaO (mol %) | ρ30 (Ωcm) | Tc (° C.) | Sintered object thickness (mm) | Oxygen concentration (ppm, %) |
|---|---|---|---|---|---|---|---|---|
| 1* | 0 | 0 | 1 | 1.9 | insulator | — | 4.0 | 9 ppm |
| 2* | 0 | 0.005 | 1 | 1.9 | 10127 | 110 | 4.0 | 9 ppm |
| 3 | 0.02 | 0.002 | 1 | 1.9 | 320 | 132 | 4.0 | 9 ppm |
| 4 | 0.02 | 0.005 | 1 | 1.9 | 288 | 132 | 4.0 | 9 ppm |
| 5 | 0.02 | 0.008 | 1 | 1.9 | 246 | 132 | 4.0 | 9 ppm |
| 6 | 0.02 | 0.02 | 1 | 1.9 | 228 | 134 | 4.0 | 9 ppm |
| 7 | 0.075 | 0.002 | 1 | 1.9 | 666 | 161 | 4.0 | 9 ppm |
| 8 | 0.075 | 0.005 | 1 | 1.9 | 545 | 162 | 4.0 | 9 ppm |
| 9 | 0.075 | 0.008 | 1 | 1.9 | 439 | 161 | 4.0 | 9 ppm |
| 10 | 0.075 | 0.02 | 1 | 1.9 | 387 | 162 | 4.0 | 9 ppm |
| 11 | 0.0875 | 0.002 | 1 | 1.9 | 2601 | 170 | 4.0 | 9 ppm |
| 12 | 0.0875 | 0.005 | 1 | 1.9 | 2556 | 170 | 4.0 | 9 ppm |
| 13 | 0.0875 | 0.008 | 1 | 1.9 | 2421 | 171 | 4.0 | 9 ppm |
| 14 | 0.0875 | 0.02 | 1 | 1.9 | 2132 | 173 | 4.0 | 9 ppm |
| 15 | 0.1 | 0.002 | 1 | 1.9 | 3109 | 170 | 4.0 | 9 ppm |
| 16 | 0.1 | 0.005 | 1 | 1.9 | 3003 | 170 | 4.0 | 9 ppm |
| 17 | 0.1 | 0.008 | 1 | 1.9 | 2985 | 171 | 4.0 | 9 ppm |
| 18 | 0.1 | 0.02 | 1 | 1.9 | 2867 | 173 | 4.0 | 9 ppm |
| 19 | 0.1375 | 0.002 | 1 | 1.9 | 5006 | 170 | 4.0 | 9 ppm |
| 20 | 0.1375 | 0.005 | 1 | 1.9 | 4911 | 170 | 4.0 | 9 ppm |
| 21 | 0.1375 | 0.008 | 1 | 1.9 | 4827 | 171 | 4.0 | 9 ppm |
| 22 | 0.1375 | 0.02 | 1 | 1.9 | 4695 | 173 | 4.0 | 9 ppm |
| 23* | 0.2 | 0.002 | 1 | 1.9 | 8323 | 230 | 4.0 | 9 ppm |
| 24* | 0.2 | 0.005 | 1 | 1.9 | 8122 | 231 | 4.0 | 9 ppm |
| 25* | 0.2 | 0.008 | 1 | 1.9 | 7834 | 234 | 4.0 | 9 ppm |
| 26* | 0.2 | 0.02 | 1 | 1.9 | 7619 | 236 | 4.0 | 9 ppm |
| 27 | 0.0875 | 0.002 | 1 | 1.9 | 1532 | 173 | 0.5 | 9 ppm |
| 28 | 0.0875 | 0.002 | 1 | 1.9 | 2285 | 173 | 8.0 | 9 ppm |
| 29 | 0.0875 | 0.002 | 1 | 1.9 | 2331 | 173 | 12.0 | 9 ppm |
| 30 | 0.0875 | 0.002 | 1 | 1.9 | 2894 | 173 | 15.0 | 9 ppm |
| 31 | 0.0875 | 0.002 | 1 | 1.9 | 2761 | 171 | 4.0 | 100 ppm |
| 32 | 0.0875 | 0.002 | 1 | 1.9 | 2947 | 171 | 4.0 | 1% |
| 33* | 0.0875 | 0.002 | 1 | 1.9 | 72 | 156 | 0.5 | 3% |
| 34* | 0.02 | 0.002 | 1 | 1.9 | 7134 | 142 | 4.0 | 3% |

TABLE 1-continued

| | | | | | | | | |
|---|---|---|---|---|---|---|---|---|
| 35* | 0.02 | 0.02 | 1 | 1.9 | 4309 | 144 | 4.0 | 3% |
| 36* | 0.075 | 0.002 | 1 | 1.9 | 10023 | 159 | 4.0 | 3% |
| 37* | 0.075 | 0.02 | 1 | 1.9 | 8209 | 159 | 4.0 | 3% |
| 38* | 0.0875 | 0.002 | 1 | 1.9 | 34297 | 171 | 4.0 | 3% |
| 39* | 0.0875 | 0.02 | 1 | 1.9 | 12224 | 170 | 4.0 | 3% |
| 40* | 0.1 | 0.002 | 1 | 1.9 | unmeasurable | 170 | 4.0 | 3% |
| 41* | 0.1 | 0.02 | 1 | 1.9 | 198563 | undeterminable | 4.0 | 3% |
| 42* | 0.1375 | 0.002 | 1 | 1.9 | unmeasurable | | 4.0 | 3% |
| 43* | 0.1375 | 0.02 | 1 | 1.9 | unmeasurable | | 4.0 | 3% |
| 44* | 0.2 | 0.002 | 1 | 1.9 | unmeasurable | | 4.0 | 3% |
| 45* | 0.2 | 0.02 | 1 | 1.9 | unmeasurable | | 4.0 | 3% |
| 46* | 0.25 | 0.002 | 1 | 1.9 | unmeasurable | | 4.0 | 9 ppm |
| 47* | 0.0875 | 0.025 | 1 | 1.9 | 43285 | 160 | 4.0 | 9 ppm |
| 48 | 0.0875 | 0.005 | 0 | 0 | 61 | 161 | 4.0 | 9 ppm |
| 49 | 0.0875 | 0.005 | 0 | 1 | 102 | 159 | 4.0 | 9 ppm |
| 50 | 0.0875 | 0.005 | 1 | 0 | 92 | 161 | 4.0 | 9 ppm |
| 51 | 0.0875 | 0.005 | 0.5 | 1.9 | 84 | 160 | 4.0 | 9 ppm |
| 52 | 0.0875 | 0.005 | 1 | 1.9 | 108 | 156 | 4.0 | 9 ppm |
| 53 | 0.0875 | 0.005 | 1 | 1.9 | 62 | 166 | 4.0 | 9 ppm |
| 54 | 0.0875 | 0.005 | 1 | 1.9 | 82 | 155 | 4.0 | 9 ppm |
| 55 | 0.0875 | 0.005 | 1 | 1.9 | 76 | 161 | 4.0 | 9 ppm |

INDUSTRIAL APPLICABILITY

The semiconductor porcelain composition provided by the invention is most suitable as a material for a PTC thermistor, a PTC heater, a PTC switch, a temperature detector or the like.

Figure 1:
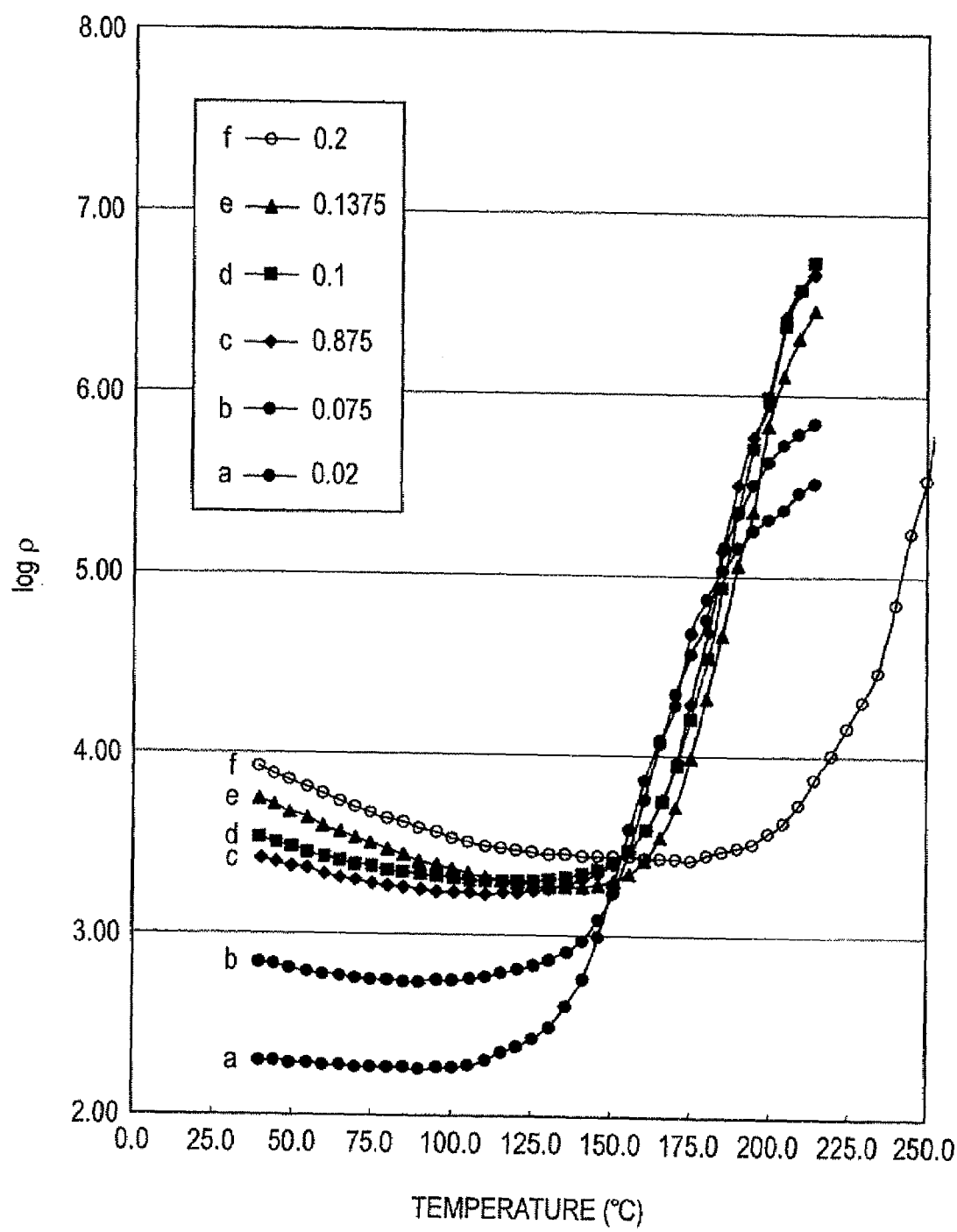
FIG. 1 is a graph showing a temperature change of a resistivity of a semiconductor porcelain composition according to the invention.

The invention claimed is:

1. A method of producing a semiconductor porcelain composition having a positive temperature coefficient of resistivity, the method comprising:
    sintering a formed composition represented by the composition formula $[(Bi_{0.5}Na_{0.5})_x(Ba_{1-y}R_y)_{1-x}]TiO_3$ in which R is at least one element of La, Dy, Eu, Gd and Y and x and y each satisfy $0<x\leq0.14$, and $0.002\leq y\leq0.02$ in an inert gas atmosphere with an oxygen concentration of 9 ppm to 1% and wherein a treatment at an elevated temperature in an oxidizing atmosphere after the sintering is not carried out.

2. The method of producing a semiconductor porcelain composition according to claim 1, wherein said composition further comprises $SiO_2$ and CaO, and the amount of $SiO_2$ is 3.0 mol % or less and the amount of CaO is 4.0 mol % or less.

3. The method of claim 1, wherein the formed composition is a disk having a thickness of at least 4 mm.

4. The method of claim 1, wherein the formed composition is a disk having a thickness of 8 to 15 mm.

5. The method of claim 1, wherein R in the composition formula is at least one of Dy, Eu, Gd and Y.

* * * * *